UNITED STATES PATENT OFFICE 2,462,384

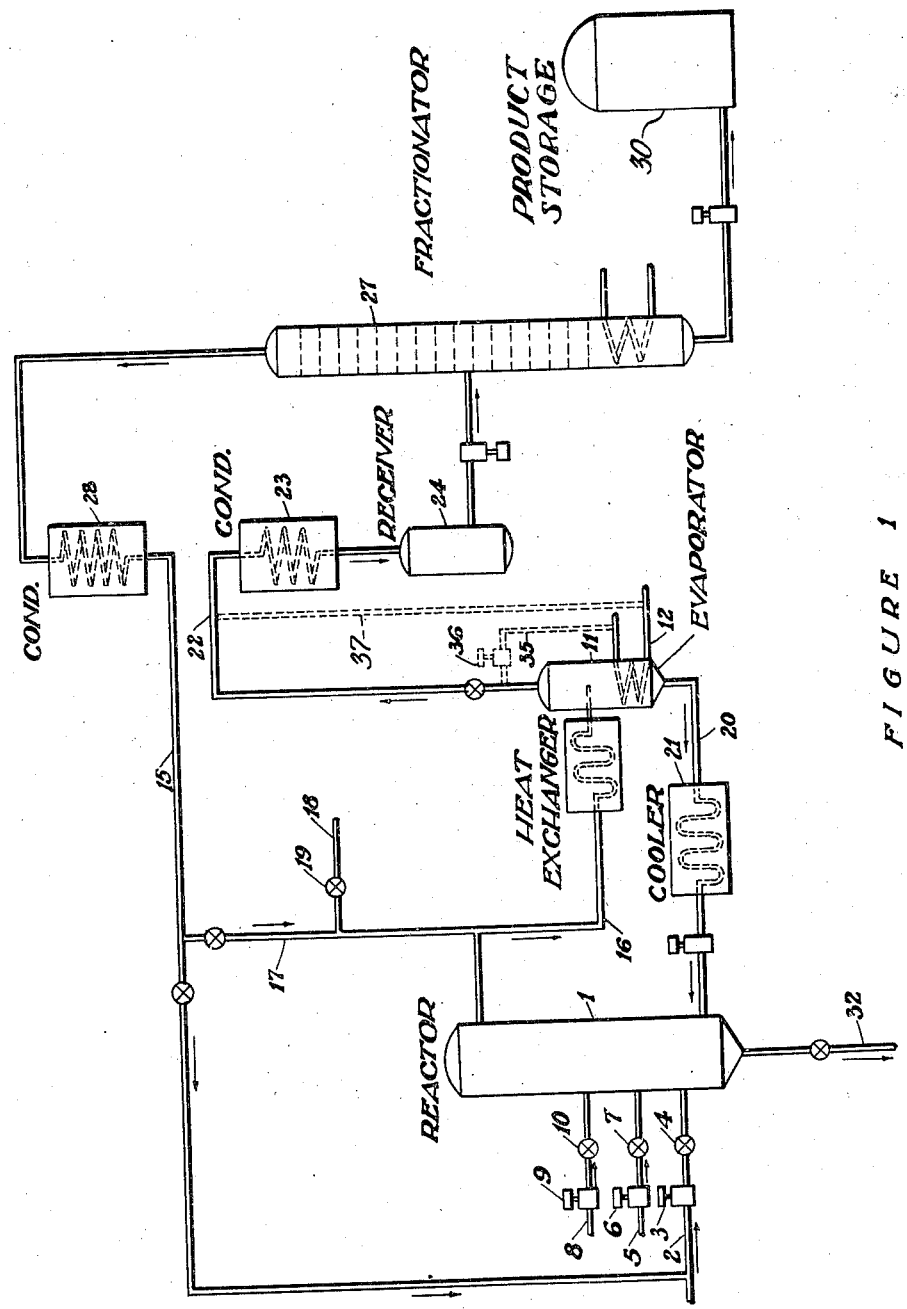

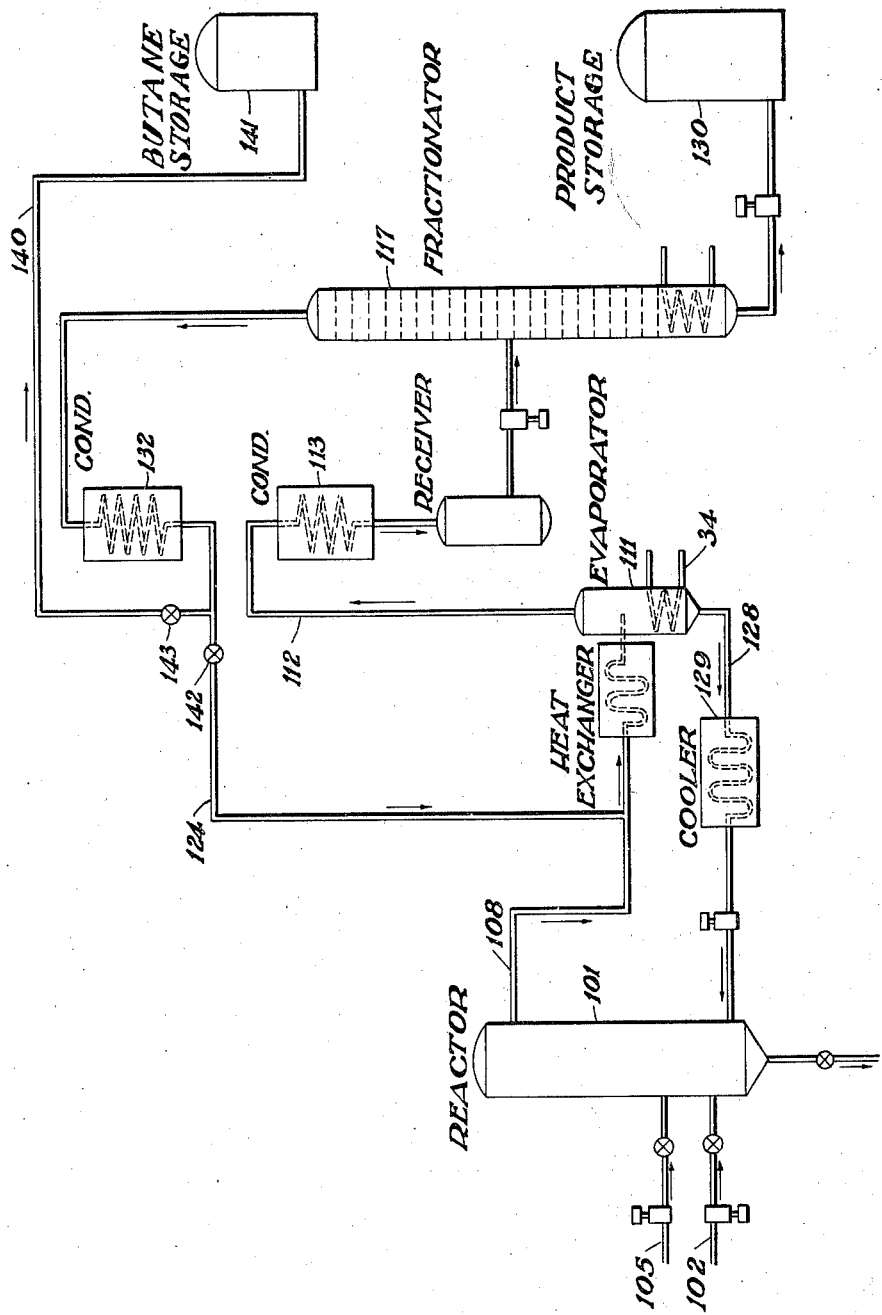

RECOVERY OF PRODUCTS OF HYDROCARBON CONVERSION REACTIONS

Manuel H. Gorin and Will Swerdloff, Dallas, Tex., assignors, by mesne assignments, to Socony-Vacuum Oil Company, Incorporated, New York, N. Y., a corporation of New York Application November 13, 1945, Serial No. 628,298

1 Claim. (Cl. 260—683.4)

This application is a continuation-in-part of our copending application Serial No. 448,886 filed June 29, 1942 and now abandoned, and is related to our copending application Serial No. 589,850 filed April 23, 1945 and now Patent No. 2,412,143, also a continuation-in-part of our application Serial No. 448,886, wherein the same subject matter is generally disclosed and separation of the products of hydrocarbon conversion reactions from soluble catalysts by vaporization is broadly claimed.

This invention relates to low temperature hydrocarbon conversion processes such as the alkylation, isomerization, reforming and the like of light hydrocarbons. More particularly this invention relates to such low temperature hydrocarbon conversion processes which are carried out with the aid of hydrocarbon soluble catalysts for the particular reaction involved.

The use of hydrocarbon soluble catalysts in solution in a hydrocarbon to effect an alkylation reaction has been disclosed in copending application Serial No. 416,864, filed October 28, 1941 and now Patent No. 2,401,925, by Manuel H. Gorin, and to effect a reforming reaction has been disclosed in U. S. Patent 2,383,123. The use of such catalysts to effect isomerization reactions is known. The process of this invention is applicable to any low temperature hydrocarbon conversion reaction carried out with the aid of any hydrocarbon soluble isomerization, reforming or alkylation catalyst. Aluminum bromide is a particularly useful catalyst for these reactions. Examples of other suitable catalysts of the type with which the process of this invention is concerned are dialkyl aluminum chlorides, aluminum iodide, stannic chloride, dialkyl boron halides and the like.

The hydrocarbon soluble catalysts are of value in these low temperature hydrocarbon conversion processes because of the ease with which intimate contact between the catalyst and the reactants may be obtained. Because of the excellent contact obtained between the catalysts and the reactants, no special agitating or mixing equipment is required, as is necessary where an immiscible liquid is the catalytic agent used. Likewise in comparison with solid catalysts a much smaller amount of catalyst is required for the same efficiency of contacting, since there is molecular contact between catalyst and the reactants. Another advantage obtained by the use of soluble catalysts as compared with solid or immiscible liquid catalysts is that the concentration of the catalyst in the reaction mixture may be varied. In many of these hydrocarbon conversion reactions the same reactants may combine in different ways to form several products. By varying the catalyst concentration, the reaction may be made to shift in favor of a particular reaction to give a desired product as the major product of the interaction of the particular hydrocarbon reactant mixture.

The primary problem encountered in the use of the soluble catalysts, which is not encountered in the broad sense in the case of the use of insoluble catalysts, is that of separation of the main portion of the products from the major portion of the reactants and catalysts. It is, therefore, a primary object of this invention to provide for the ready separation of product and catalyst, and for the recirculation of the latter back to the reaction mixture.

Another object of this invention is to provide a method for the separation of product and catalyst which may be carried out continuously, and which will not tie down the rate and conditions for carrying out the reaction to the rate and conditions used for the separation of product, catalyst and unreacted hydrocarbons.

Other objects of the invention will be apparent from the description thereof, and from the appended claims.

The general procedure followed in carrying out the hydrocarbon conversion process which forms the subject matter of our invention is to introduce the hydrocarbon and other reactants, if required, into a reaction zone, along with a hydrocarbon soluble catalyst; withdraw a portion of the reaction mixture containing products, unchanged reactants, and dissolved catalyst to a separation zone; divide the mixture into two fractions in the separation zone, one consisting principally of a solution of catalyst in unchanged reactants and/or product, which is recirculated directly back to the reaction zone, and the other, consisting essentially of product accompanied by varying amounts of reactants, is drawn off for subsequent recovery of the product. The product in this second fraction may be separated from the unchanged reactants, and minor amounts of catalyst carried along therewith, by any suitable method, and the particular method chosen will depend to some extent on the characteristics of the product and reactants in the particular hydrocarbon conversion process to which our method is applied. Generally a fractional distillation of unchanged reactants from the product will be the most economical and the preferred method.

The method used to separate the bulk of the product from the bulk of the catalyst in the separation zone is that of evaporation. A condition essential for the successful operation of the process is, therefore, that the boiling points of the catalyst and the product differ sufficiently at some pressure at which operation of the evaporator is feasible so that one may be vaporized while the other will largely remain as a liquid. But it is not strictly essential that the boiling point of the reactant or the various reactants be different from the boiling points of either the product or catalyst. In those cases where the product is lower boiling than the reactants, the process has the additional advantage of separating the product more or less completely from the reactants, as well as from the catalyst. Where the reactants are lower boiling than the products, sufficient reactant must be vaporized to carry over the product and separate it from the catalyst. In order to facilitate the vaporization of the product in such cases, particularly where the product is considerably higher boiling than the reactants, a light volatile hydrocarbon or other inert volatile liquid or gas, which will not react with the catalyst used, is added to the reaction mixture as a stripping agent. This stripping agent may be added to the reaction mixture either in the reactor, or just prior to entry into the separation zone, or separately into the separation zone itself. The volatilization of this added light hydrocarbon or the passage of the inert gas through the separation zone will assist in the carrying over of the product.

Sufficient hydrocarbons must be associated with the catalyst leaving the separation zone to keep the catalyst in solution, and thus avoid any undesirable precipitation of the catalyst. This imposes a limit upon the amount of hydrocarbons which may be vaporized in the separation zone.

Our invention may be best understood from the following description thereof in conjunction with the discussion of the drawings.

In the drawings:

Figure 1 shows diagrammatically an apparatus for carrying out the invention when applied to an alkylation reaction.

Figure 2 shows diagrammatically an apparatus for carrying out the invention when applied to a reforming reaction of the type in which a natural gasoline is reformed to yield a product having a higher octane rating.

Referring to Figure 1 the principles of our invention as applied to an alkylation reaction are shown. An isoparaffin, such as isobutane, is fed to reactor 1 through line 2, provided with pump 3, and valve 4. Aluminum bromide, preferably in solution in isobutane, is introduced into the reactor through line 5 provided with pump 6 and valve 7. An alkylating agent such as propylene is introduced into reactor 1 through line 8 provided with pump 9 and valve 10. The reaction mixture after being heated is fed into the evaporating concentrator 11, which is provided with heating coil 12, to furnish part of the necessary heat of vaporization. The product, in this case branched chain heptanes, is higher boiling than the unreacted reactant, isobutane, in the reaction mixture. The mixture must be heated sufficiently to vaporize the desired amount of the heptanes. Naturally, a considerable proportion of the lower boiling isobutane vaporizes also. In alkylation reaction, as is well known in the art, it is customary to have a considerable excess of the isoparaffin reactant to minimize side reactions of the olefin. The vaporization of this isobutane helps carry over the heptanes. Because of the substantial difference in boiling points it may frequently not be desirable or necessary to have sufficient excess isobutane in the alkylation zone, because of the increase in reactor size and costs, to effect the product vaporization to the desired extent. This is particularly true where propylene or higher olefin alkylates are the products to be separated out. A stripping gas, as heretofore mentioned, may therefore be introduced either into the reactor effluent or the evaporating concentrator. This gas may be isobutane itself in which case part of the recycle isobutane from the final product fractionation steps would be recycled to the reactor feed and another part to the reactor effluent or concentrator. Other paraffinic hydrocarbons as normal butane, propane, or pentanes may be used. Where a volatile liquid such as the pentanes are used, they may be added either as a liquid or a gas. Inert gases as nitrogen or carbon dioxide may also be added instead of or in addition to a paraffinic stripping agent. A part of the recycle excess isobutane in line 15 may therefore be introduced into the reactor effluent in line 16 leading from the reactor to the concentrator, via line 17. Other, or additional stripping liquid or gas may be introduced into line 16 by way of line 18, provided with valve 19, and line 17.

The higher boiling catalyst and a sufficient amount of hydrocarbons to keep it in solution flow from evaporator 11 back to reactor 1 via line 20, after being cooled to reaction temperature in cooler 21.

The vapors from evaporator 11 in line 22 are condensed in condenser 23 and collected in receiver 24. The condensate is introduced into fractionator 27, wherein the isobutane vapor is separated overhead, and, after condensation in condenser 28, recycled via line 15 to the reactor as heretofore described. In the case of the alkylation reaction, the product is the higher boiling and is drawn off from the bottom of the fractionator for storage in tank 30. Spent catalyst, in the form of an insoluble complex between the soluble catalyst and the hydrocarbons, is drawn off either intermittently or continuously from the bottom of reactor 1 through valve line 32.

Figure 2 shows the principles of our invention applied to a typical reforming process in which a natural gasoline is reformed in the presence of a soluble catalyst such as aluminum bromide to give a product having a higher octane rating. The natural gasoline, containing 5 to 9 carbon atom hydrocarbons, is fed into the reactor 101 through line 102. Aluminum bromide is introduced, preferably in solution in the natural gasoline or a light paraffin hydrocarbon, through line 105. The reactor effluent is sent via line 108 to evaporating concentrator 111. Evaporator 111 is operated under conditions so that the gasoline, and lower boiling hydrocarbons are vaporized and carried over via line 112 and condenser 113 to fractionator 117. To secure the desired vaporization it is usually desirable to introduce some $C_4$ hydrocarbons into the reaction mixture prior to their passage into the evaporator. The necessary $C_4$ hydrocarbons may be introduced from line 124, the fractionator overhead stream, into line 108. During the reforming operation some $C_4$ hydrocarbons are produced, as well as some higher boiling hydrocarbons of from 10 to 12 carbon atoms. Addition of $C_4$ hydrocarbons to the reactor effluent makes it possible to readily vaporize the desired fraction without excessive heating of the reaction mixture, thus minimizing catalyst vaporization and undesirable side reactions.

The material not vaporized in evaporator 111, mainly hydrocarbons of 10 to 12 carbon atoms and the catalyst, is recycled via line 128, provided with cooler 129 to the reactor. In the reactor these long chain hydrocarbons reform to shorter chain carbon atom hydrocarbons.

The vapor from the evaporator passes to fractionator 117 wherein the C4 hydrocarbons are separated from the gasoline boiling hydrocarbons, which are removed as bottoms and sent to storage tank 130. The butane vapors are condensed in condenser 132 and returned to the process to carry over more gasoline boiling product through line 124. As mentioned above, some butanes are formed in the process, and to prevent a continuous accumulation of butanes in the system, the excess butanes formed are removed through lines 140 and accumulated in storage tank 141. Valves 142 and 143 are provided in lines 124 and 140, respectively, to control the division of flow of the butane.

The particular reactions given above in connection with the description of the drawings are by way of illustration only and are not to be construed as limiting the invention. As stated in the objects of the invention it is applicable to any low temperature hydrocarbon conversion reaction which may be catalyzed by a hydrocarbon soluble catalyst. The invention is not intended to include within its scope high temperature hydrocarbon conversion reactions such as cracking. The reactions with which this invention is concerned are generally carried on at temperatures below 150° to 200° C., although somewhat higher temperatures may be used in special cases. In general the reactions are characterized in that they do not involve the formation of appreciable amounts of fixed gases such as hydrogen, methane and ethane by decomposition and cracking of the hydrocarbons undergoing reaction.

Since the reaction with which the invention is concerned involves the use of a hydrocarbon soluble catalyst, an essential condition of the reaction is that a hydrocarbon be present in the liquid phase. It is an essential, therefore, that the reaction temperature be below the critical temperature of the hydrocarbon or hydrocarbon mixture which serves as a solvent for the catalyst. This liquid hydrocarbon is generally one of the reactants in the process, although in special cases where an inert hydrocarbon is added to serve as a carrier for the product in the separation zone, the hydrocarbon reactant or reactants may be introduced as gases for convenience and to produce agitation of the reaction mixture in the reaction zone.

The invention has been illustrated as applying to alkylation, reforming, and condensation reactions in general.

No particular type of concentrating evaporator is required for separation of the product and the catalyst. Where the product is readily volatilized a simple flash evaporator may be used. Where a flash evaporator is used it should be provided with suitable baffle plates to minimize entrainment of higher boiling hydrocarbons and catalyst in the outgoing vapors. Generally the reaction mixture being fed to the evaporator will be partially vaporized in the heater and the two phases will complete their separation in the evaporator itself. Any suitable heating coil may be inserted in the evaporator. It is generally desirable to operate the evaporator at relatively low pressure in order to reduce the temperature required to vaporize the desired component of the reaction mixture. Where a normally inert gas is used as the stripping agent such as nitrogen or methane, the gas may be heated prior to introduction into the evaporator wherein it serves as the stripping agent. The essential requirements are the operation of the evaporator under such conditions of temperature, pressure, and heat input that sufficient hydrocarbons are retained in the liquid phase to keep the soluble catalyst substantially completely in solution, and the substantially complete removal of the vapor phase from the vaporization zone before condensation to avoid the return of any substantial amount of the overhead to the liquid phase in the evaporator for further contact with the catalyst or to the reaction zone with the catalyst recycle. Refluxing of liquefied overhead should be avoided insofar as practicable since it will promote possible side reactions of the products as well as permit any high boiling materials, as, for example, heavy alkylate formed in an alkylation reaction to accumulate in the reaction zone.

Since these reactions are generally exothermic, suitable cooling means may be found necessary for the reaction zone to maintain the reaction temperature at the desired level. These cooling means may be the conventional cooling coils placed in or around the reactor. One method which has been found particularly useful in controlling the temperature of the reactor is to operate at a pressure so that a portion of the reaction mixture is vaporized as a result of the exothermic heat of the reaction. These vapors are withdrawn from the reaction zone and compressed. A portion of the compressed gases may be condensed and this condensate recirculated to the reaction zone wherein its subsequent vaporization will control the temperature by taking up excess heat of reaction. Another portion of this compressed gas may be recirculated to the bottom of the reaction zone and introduced through a suitable bubble plate. This gas in rising through the reaction zone will produce sufficient agitation for a reaction of this type involving the use of a soluble catalyst.

Since some agitation is desirable even though a soluble catalyst is used, it is frequently desirable to introduce one of the reactants, where two are involved, or a portion of the reactant, where only one reactant is involved into the bottom of the reactor in the gaseous phase to furnish the desired agitation. In those cases in which it is desirable to have a hydrocarbon carrier present to assist in the vaporization of the product from the catalyst in the separation zone, the catalyst may be dissolved in the hydrocarbon carrier and all of the reactant material introduced as a gas.

In the description of the invention and in the drawings, a heater has been shown interposed between the reaction zone and the separation zone to supply heat for vaporization of the product. In cases where it is undesirable to have the vaporization temperature much or any higher than the reaction temperature the evaporator may be operated at reduced pressure to secure the necessary vaporization. Naturally some heat must be supplied in any case to supply the heat of vaporization for the product vapors and for any reactant and carrier vapors formed in the separation zone. A heating coil, placed in the evaporator, will serve to supply the necessary heat as the vaporization occurs.

Since it is desirable to feed the product-containing vapor into the fractionator as a liquid, this vapor may be compressed as it leaves the evaporator and recirculated in heat exchange relationship with the evaporator or the evaporator feed to effect at least partial condensation of these compressed vapors. This has been shown diagrammatically in Figure 1, wherein it is indicated that, alternatively, a part or all of the evaporator overhead vapors in line 22 may be sent via line 35 and compressor 36 to heating coil 12. The vapor-liquid mixture formed may then be returned via line 37 to line 22 and to condenser 23 to complete its condensation before introduction into fractionator 27 as described above. The heat of condensation of this compressed product-containing vapor will supply part of the heat necessary to evaporate the desired components of the evaporator feed. This return of the heat of evaporation to the evaporator would not be 100 percent complete but it plus the heat of compression would generally eliminate the necessity for additional heat for the evaporator feed. Should any additional heat be necessary it would be a minor amount and could be supplied at a relatively low temperature level, thus minimizing the temperature rise of the evaporator feed.

As mentioned previously in the discussion of Figure 1, a portion of the catalyst must be drawn off for regeneration because of the continuous formation of a complex between the soluble catalyst and the hydrocarbons. Even though this catalyst-hydrocarbon complex may have considerable catalytic activity, it is immiscible with the hydrocarbon and tends to accumulate in the bottom of the reaction zone. This catalyst should be drawn off and regenerated to recover the active catalytic compound. The particular method used for regeneration of the catalyst will depend upon the soluble catalyst used. This recovered catalyst will then be returned to the reaction zone. The catalyst recovery will not be 100 percent complete and a small amount of catalyst may likewise be carried over with the reaction products. Some make-up catalyst will be required, as is customary in the case of catalytic reactions, and this make-up catalyst may be added along with the regenerated catalyst.

In the foregoing description of our invention, the process has been illustrated as applied to a fully continuous process, in which the catalyst containing hydrocarbon mixture is continuously withdrawn from a reactor, circulated to an evaporator, and the catalyst containing portion, usually the unvaporized fraction, continuously returned to the same reactor. Frequently it may be preferable to use a battery of reactors with a single evaporator. In such operation, the evaporator would operate continuously, but the operation of each unit in the battery or reactors would be, strictly speaking, discontinuous. That is one reactor would be discharging at all times to the evaporator. The unvaporized hydrocarbon-catalyst mixture would be returning to another reactor, which would also be receiving fresh feed for reaction. The remaining reactors in the battery would be temporarily operating as batch reactors. When the contents of the discharging reactor had been removed to a predetermined extent, another reactor would be set to discharge to the evaporator, and the unvaporized material from the reactor set to return to a discharged reactor. Suitable valves would be provided to provide the desired sequence of operation for charging and discharging of each unit in the battery of reactors. The sequence of operation of such a battery of reactors might be a series operation. In such a case the discharge to the evaporator would be constant from the last reactor in the series, and the unvaporized catalyst containing mixture returned to the first reactor. The intermediate reactors would contain reaction mixture in which the reaction had proceeded in varying degrees towards completion. Any other desired sequence of operation might be followed in some of which each reactor unit would be operated for a portion of the time as a batch unit, completely disconnected from the evaporator, and only periodically would discharge to the evaporator and recycling of the feed occur.

Many other modifications of our invention will be apparent to those skilled in the art and therefore only such limitations should be imposed as are indicated in the appended claim.

We claim:

That the method of conducting a low temperature hydrocarbon conversion reaction in which at least one reactant is a hydrocarbon, which comprises conducting the reaction in a reaction zone in the presence of at least one liquid hydrocarbon, said liquid hydrocarbon having dissolved therein a hydrocarbon soluble compound that is a catalyst for the desired reaction, withdrawing liquid reaction mixture containing reactant, product and dissolved catalyst from said reaction zone, feeding the withdrawn reaction mixture to a separation zone, producing a phase difference between catalyst and product by vaporization of the product in said separation zone regulating the amount of vaporization so that sufficient reaction mixture remains in the liquid state to act as a solvent for the hydrocarbon soluble catalyst, separating the product containing vapor from the liquid catalyst containing material, compressing the product vapor to a pressure at which at least some of the vapor will condense under the temperature conditions in the separation zone, passing the compressed vapor in heat exchange relation with the material in the separation zone, whereby at least some of the vapor is condensed and its heat of condensation is available to aid in the vaporization, and recycling the catalyst containing phase to the reaction zone for admixture with and use in the conversion of fresh reactant.

MANUEL H. GORIN.
WILL SWERDLOFF.

REFERENCES CITED

The following references are of record in the file of this patent:

UNITED STATES PATENTS

| Number | Name | Date |
| --- | --- | --- |
| 2,057,432 | Ipatieff et al. | Oct. 13, 1936 |
| 2,270,292 | Grosse | Jan. 20, 1942 |
| 2,271,956 | Ruthruff | Feb. 3, 1942 |
| 2,342,923 | Danforth | Feb. 29, 1944 |
| 2,398,908 | Miller | Apr. 23, 1946 |
| 2,412,143 | Gorin et al. | Dec. 3, 1946 |